United States Patent
Ho et al.

(10) Patent No.: US 9,542,485 B1
(45) Date of Patent: Jan. 10, 2017

(54) METHOD AND SYSTEM FOR MUSIC PROGRAM SELECTION

(71) Applicant: TP Lab, Inc., Palo Alto, CA (US)

(72) Inventors: Chi Fai Ho, Palo Alto, CA (US); Shin Cheung Simon Chiu, Palo Alto, CA (US)

(73) Assignee: TP Lab, Inc., Palo Alto, CA (US)

( * ) Notice: Subject to any disclaimer, the term of this patent is extended or adjusted under 35 U.S.C. 154(b) by 222 days.

(21) Appl. No.: 13/943,386

(22) Filed: Jul. 16, 2013

Related U.S. Application Data

(63) Continuation of application No. 13/676,089, filed on Nov. 13, 2012, now Pat. No. 9,081,375, and a continuation of application No. 12/717,264, filed on Mar. 4, 2010, now Pat. No. 8,378,197, and a continuation-in-part of application No. 11/714,554, filed on Mar. 5, 2007, now Pat. No. 7,700,865.

(51) Int. Cl.
*G10H 1/36* (2006.01)
*G06F 17/30* (2006.01)

(52) U.S. Cl.
CPC ................... *G06F 17/3074* (2013.01)

(58) Field of Classification Search
USPC .................................................. 84/615, 634
See application file for complete search history.

(56) References Cited

U.S. PATENT DOCUMENTS

| | | | | |
|---|---|---|---|---|
| 5,986,200 | A * | 11/1999 | Curtin | 84/609 |
| 2003/0000369 | A1* | 1/2003 | Funaki | 84/609 |
| 2004/0237759 | A1* | 12/2004 | Bill | 84/668 |
| 2006/0107822 | A1* | 5/2006 | Bowen | 84/612 |
| 2008/0115655 | A1* | 5/2008 | Weng | G10H 1/0008 84/609 |

* cited by examiner

*Primary Examiner* — Christopher Uhlir
(74) *Attorney, Agent, or Firm* — North Shore Patents, P.C.; Michele Liu Baillie

(57) ABSTRACT

In providing a music program, a personal music player displays personal activity choices. A user selects a personal activity and provides a time duration for the activity. The player sends a request to a music program server for a music program. The request includes the personal activity and the time duration. The music program server selects a music program record from a plurality of music program records that has an activity attribute which matches the personal activity and a program duration which matches or is less than the time duration. The server extracts location information for the music program from the program entry in the music program record, and sends this to the player. The player uses the location information to obtain the music program. In this manner, a music program is provided to a user based on the personal activity of the user.

24 Claims, 7 Drawing Sheets

METHOD AND SYSTEM FOR MUSIC PROGRAM SELECTION

CROSS-REFERENCE TO RELATED APPLICATIONS

This application is a continuation of co-pending U.S. patent application Ser. No. 13/676,089, filed on Nov. 13, 2012; which in turn is a continuation of U.S. patent application Ser. No. 12/717,264, filed on Mar. 4, 2010, now U.S. Pat. No. 8,378,197 issued on Feb. 19, 2013; which in turn is a continuation-in-part of U.S. patent application Ser. No. 11/714,554, filed on Mar. 5, 2007, now U.S. Pat. No. 7,700,865, issued on Apr. 20, 2010.

BACKGROUND OF THE INVENTION

Field

This invention relates generally to audio media, particularly to method and system for selecting a music program for a personal activity.

Related Arts

Personal music listening experience is fundamentally enhanced with the introduction of MP3 players. The large storage capacity, the ease of song downloading from a network, and the sophisticated capabilities of an MP3 player provide unprecedented choices in music selection. Additionally, the prolonged play time enabled by better power utilization of a MP3 player liberates a user to undertake a wide range of personal activities while listening to music, from taking a walk in the neighborhood, cooking a meal, working out in a gym, taking a 4-hour nature hike, taking a bath, to spending a long lazy afternoon lying on a campus lawn.

Nevertheless, a user oftentimes finds the new listening experience less than satisfying.

In one example, Melinda goes to a gym for her 45-minute workout session in mid afternoon. She likes to listen to fast tempo and spirited music numbers that goes with her favorite high workout intensity. Using her MP3 player, Melinda tries to find a XM satellite channel that provides the same. Unfortunately, all she can find is a slow pace religious music program.

In another example, Andy enjoys music while engaging in a variety of personal activities. In order to play the kind of music that complements the activity, Andy has to spend time to put together several playlists from the vast music collection in his MP3 player. In one instant, after a long and stressful day at work, Andy wants to unwind in his sauna and listen to some ambient soulful music. However, after shuffling through the directory of his music collection for 5 minutes, Andy is able to find only half a dozen songs, not quite enough to last for an hour of relaxing moment that he has in mind.

In one more example, John is taking a commuter train to work in downtown New York. From his music collection in his MP3 player, he plays Simon and Garfunkel's 1981 "The Concert in Central Park" to start his day. Unfortunately, when he arrives at his office building, the concert is barely half way through. John reluctantly stops the music and greets his co-workers, feeling unsatisfied for the rest of the morning.

The above discussion demonstrates the need for a solution to provide a music program based on the personal activity of a user.

BRIEF SUMMARY OF THE INVENTION

In providing a music program, a personal music player displays personal activity choices. A user selects a personal activity and provides a time duration for the activity. The player sends a request to a music program server for a music program. The request includes the personal activity and the time duration. The music program server selects a music program record from a plurality of music program records that has an activity attribute which matches the personal activity and a program duration which matches or is less than the time duration. The server extracts location information for the music program from the program entry in the music program record, and sends this to the player. The player uses the location information to obtain the music program. In this manner, a music program is provided to a user based on the personal activity of the user.

DETAILED DESCRIPTION OF THE INVENTION

As will be appreciated by one skilled in the art, aspects of the present invention may be embodied as a system, method or computer program product. Certain aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium which may be, for example, but not limited to, an electronic, magnetic, optical, electromagnetic, infrared, or semiconductor system, apparatus, or device, or any suitable combination of the foregoing. A computer readable storage medium may be any tangible medium that can contain, or store a program for use by or in connection with an instruction execution system, apparatus, or device.

Aspects of the present invention are described below with reference to block diagrams of methods, apparatus (systems) and computer program products according to embodiments of the invention. It will be understood that each block of the block diagrams, and combinations of blocks in the block diagrams, can be implemented by computer program instructions. These computer program instructions may be provided to a processor of a general purpose computer special purpose computer or other programmable data processing apparatus to produce a machine, such that the instructions, which execute via the processor of the computer or other programmable data processing apparatus, create means for implementing the functions/acts specified in the block diagram block or blocks.

Figure 1A:
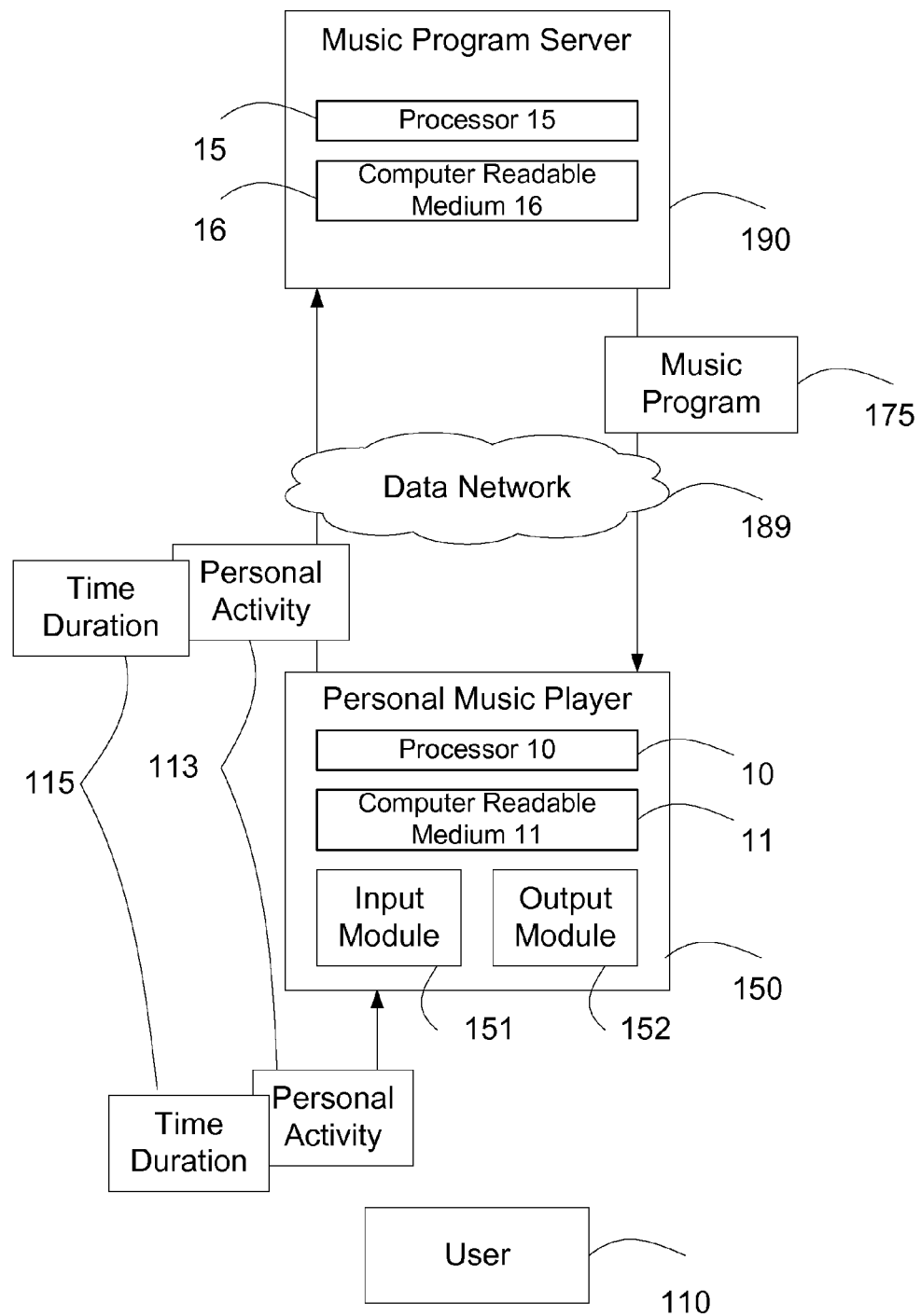
FIGS. 1a-1b illustrate a personal music player playing a music program during a personal activity.

FIG. 1a illustrates a personal music player playing a music program during a personal activity.

A user 110 uses a personal music player 150 to play a music program 175 while undertaking a personal activity 113 for time duration 115.

Music program 175 is encoded in an audio digital format, such as Moving Picture Experts Group 1 (MPEG-1 Level-3) also known as MP3, Windows Media Audio (WMA), Advanced Audio Coding (AAC), Apple Lossless Audio Codec (ALAC) Pulse Code Modulation (PCM), or Adaptive PCM (ADPCM) digital format.

In one embodiment, music program 175 is a recorded music program presented by a host, such as the weekly radio program "MusicDeli" produced by the ABC Radio National, "Jazztrack with Mal Stanley", or "Blueprint" hosted by Kevin Lincoln. In one embodiment, music program is a movie soundtrack such as Disney's "Chicken Little", "Rocky Honor Picture Show" produced by John Goldstone, James Stewart's classic "It's A Wonderful Life", or Kander and Ebb's musical "Chicago". In one embodiment, music program 175 is a recorded concert performance such as Simon and Garfunkel's 1981 "The Concert in Central Park", Elvis Presley's last live performance at Market Square Arena on Jul. 16, 1977, and Peter, Paul & Mary' 1988 reunion special "A Holiday Concert" produced by Public Broadcasting Service (PBS).

In one embodiment, music program 175 includes a song, such as John Lennon's "When I'm Sixty Four", Jennifer Lopez's "Let's Get Loud", Bob Dylan's "Times They Are A-changing", or Paul Simon and Art Garfunkel's "The Boxer" performed in New York City's Central Park in September 1981. In one embodiment, music program 175 includes an instrumental, such as Kenny G's "Forever In Love", Chopin's "Concerto in F Minor" or Pink Floyd's "Comfortably Numb" performed by David Gilmour. In one embodiment, music program 175 includes comment or annotation by the host about an included song or instrumental, such as the background of the composer or performer, the occasion of the performance, or the musical characteristics. In one embodiment, the comment or annotation is before, after, or during an included song or instrumental.

Personal music player 150 is a mobile audio device for personal music listening. In one embodiment, user 110 carries personal music player 150 in a shirt pocket, a purse or a backpack. In one embodiment, user 110 wears personal music player 150 in an armband. In one embodiment, user 110 wears personal music player 150 as part of a headset. Personal music player 150 is capable of playing music program 175.

In one embodiment, personal activity 113 is taking a walk during a break. In one embodiment, personal activity 113 is cooking a dinner. In one embodiment, personal activity 113 is a work out session in a gym. In one embodiment, personal activity 113 is a meditating session after work. In one embodiment, personal activity 113 is morning commuting to work. In one embodiment, personal activity 113 is studying in a library after school. In one embodiment, personal activity 113 is reading before bedtime, knitting after supper, taking a shower, taking a bath, gardening, a 5-mile jog, or doing nothing for an hour.

In one embodiment, time duration 115 of personal activity 113 is 40 minutes, 45 minutes, 2 hours, or 10 minutes.

Music program 175 lasts for a period of time close to time duration 115. In one embodiment, music program 175 lasts for 15 minutes, 42 minutes, 60 minutes, 20 minutes or 4 minutes 32 seconds.

Personal music player 150 includes a processor 10 and a computer readable medium 16. The computer readable medium stores computer readable program code for implementing the method of the present invention.

Personal music player 150 includes output module 152 for playing music program 175. In one embodiment, output module 152 includes a wired headset. In one embodiment, output module 152 includes a wireless headset, such as a Bluetooth headset. In one embodiment, the wireless headset is based on other technologies such as Wi-Fi, Wibree, ZigBee or Frequency Modulation (FM) technology. In one embodiment, output module 152 includes a speaker.

Personal music player 150 includes input module 151 for user 110 to enter information about personal activity 113 and time duration 115. In one embodiment, input module 151 includes a touch wheel, a touchscreen, a keypad, a keyboard or a stylus. In one embodiment, input module 151 includes a microphone and speech recognition capabilities.

In one embodiment, user 110 uses input module 151 to enter a phrase such as "weight lifting workout session" or "reading a book". Personal music player 150 determines personal activity 113 based on the entered information. In one more embodiment, user 110 speaks the phrase at the microphone in input module 151.

Figure 1B:
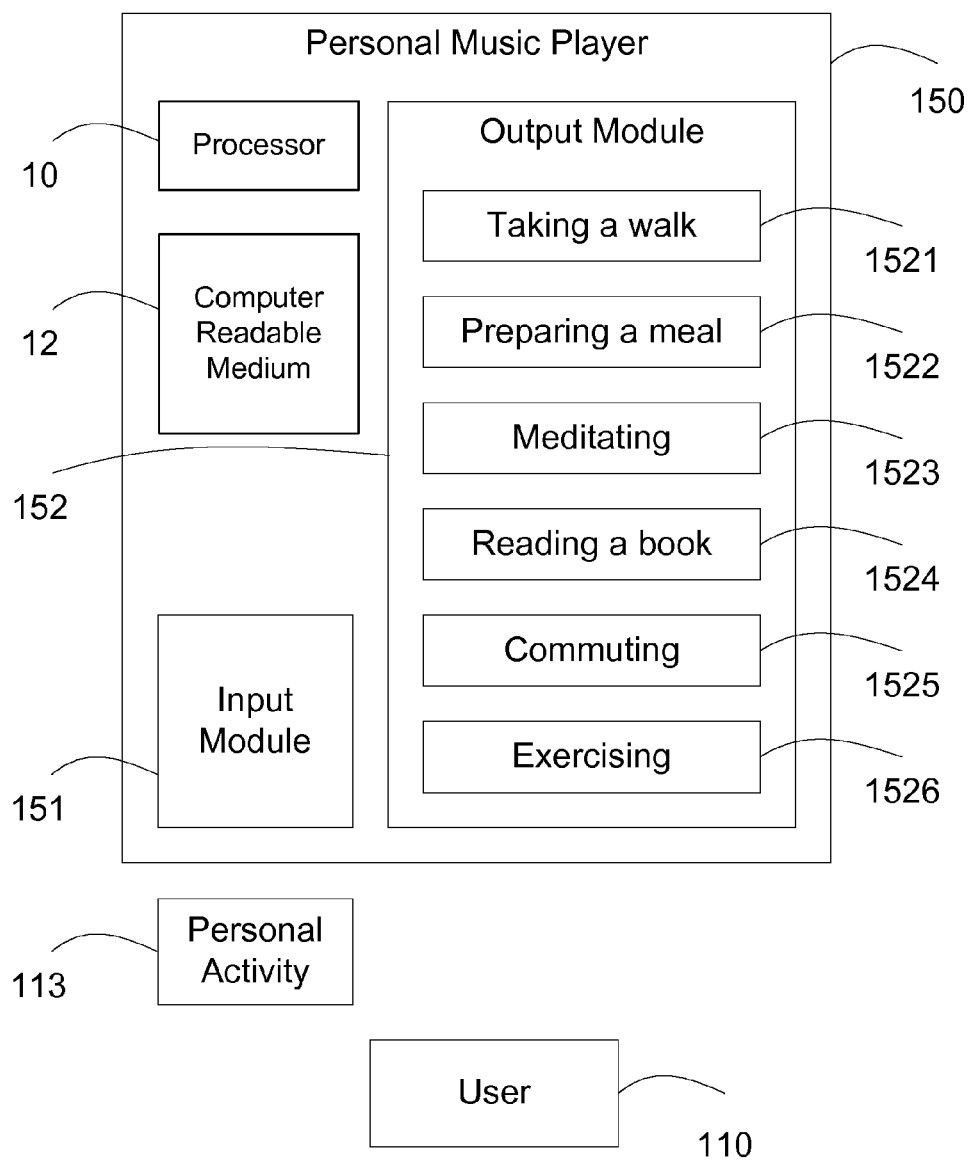

In one embodiment, output module 152 includes a graphical display. Personal music player 150 displays a plurality of personal activity choices at output module 152, allowing user 110 to select personal activity 113 from the list of choices using input module 151. In one example, as illustrated in FIG. 1b, personal music player 150 displays personal activity choices of "taking a walk" 1521, "preparing a meal" 1522, "meditating" 1523, "reading a book" 1524", commuting "1525" and "exercising" 1526. User 110 uses input module 151 to select one of the choices as personal activity 113. In one embodiment, user 110 uses the stylus in input module 151 to select one of the choices.

In one embodiment, personal music player 150 displays a plurality of time duration choices at output module 152, allowing user 110 to select time duration 115 from the list of choices. In one example, personal music player 150 displays time duration choices of "25 minutes", "45 minutes", "1 hour", and "1 hour 20 minutes". User 110 uses input module 151 to select one of the choices as time duration 115.

In one embodiment, user 110 uses input module 151 to enter a time, such as "43 min" or "1 hour 10 minutes". Personal music player 150 determines time duration 115 based on the entered information.

Personal music player 150 connects to a music program server 190. In one embodiment, personal music player 150 connects to music program service 190 over a data network 189. In one embodiment, personal music player 150 includes music program server 190.

The music program server 190 includes a processor 15 and a computer readable medium 16. The computer readable medium 16 stores computer readable program code for implementing the method of the present invention.

In one embodiment, data network 189 includes the Internet. In one embodiment, data network 189 includes an Internet service provider network. In one embodiment, data network 189 includes a broadband network based on Digital Subscriber Line (DSL) or cable modem technology. In one embodiment, data network 189 includes a cellular based data network such as General Packet Radio Service (GPRS) network, CDMA2000 network, Wideband Code Division Multiple Access (W-CDMA) network, or third-generation (3G) network. In one embodiment, data network 189 includes a private network of a business entity, such as a fitness center, a hotel, a café, or an airport. In one embodiment, data network 189 includes a home network. In one embodiment, data network 189 includes a hotspot WiFi network.

Personal music player 150 requests music program server 190 for a music program. Personal music player 150 provides personal activity 113 and time duration 115 to music program server 190. In one embodiment, personal music player 150 provides personal activity 113 and time duration 115 using a Hypertext Transfer Protocol (HTTP) message. In one embodiment, personal music player 150 provides personal activity 113 and time duration 115 in a Remote Method Innovation (RMI) message. In one embodiment, personal music player 150 provides personal activity 113 and time duration 115 over an Application Programming Interface (API).

Music program server 190 determines music program 175 based on personal activity 113 and time period 115. Music program server 190 sends information for music program 175 to personal music player 150. In one embodiment, music program server 190 sends music program 175 to personal music player 150.

Figure 2:
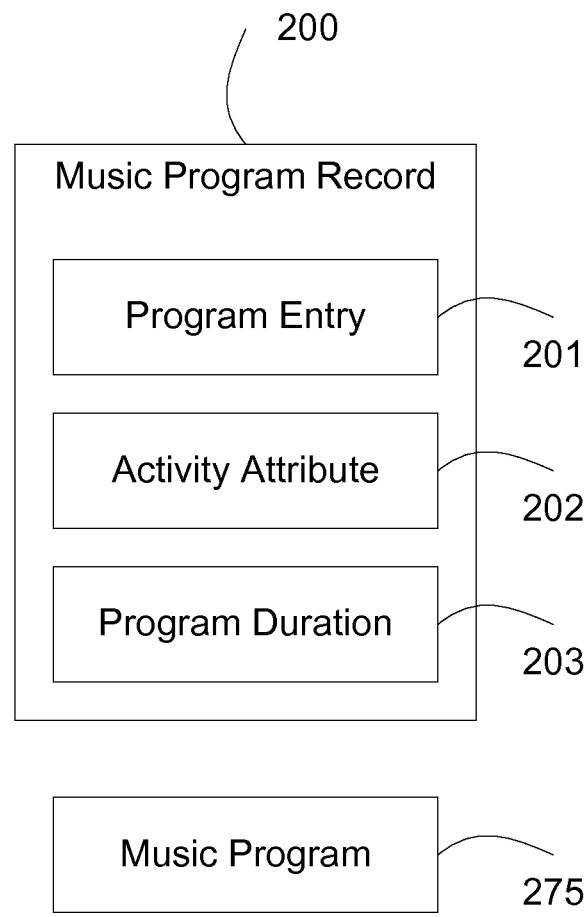
FIG. 2 illustrates a music program record.

FIG. 2 illustrates a music program record.

A music program record 200 includes a program entry 201, an activity attribute 202, and a program duration 203.

Program entry 201 includes location information for obtaining music program 275. In one embodiment, the location information is a Web Universal Resource Identifier (URI), such as http://www.musicprogram.com/softrock/musicdeli/4352.mp3. In one embodiment, the location information includes an URI based on Real Time Streaming Protocol (RTSP), such as rtsp://emusic.com/8997A9Y82.sdp. In one embodiment, the location information is a file name.

Activity attribute 202 indicates a personal activity, such a "taking a walk", "cooking", "commuting", "taking a bath" or "jogging".

Program duration 203 is a time period of music program 275 such as 45 minutes, 60 minutes or 22 minutes.

Figure 3A:
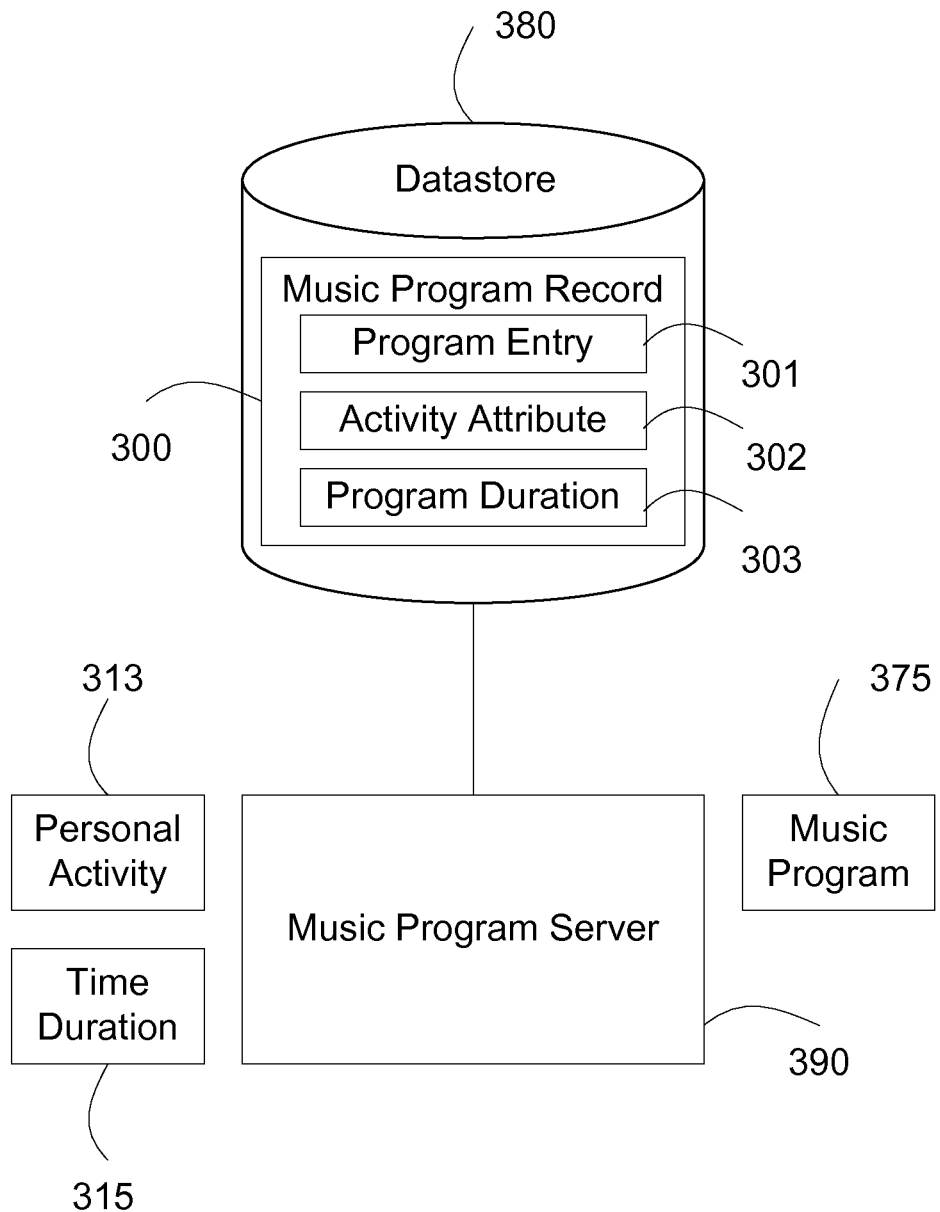
FIG. 3a illustrates a process to determine a music program.

FIG. 3a illustrates a process to determine a music program.

Music program server 390 determines music program 375 based on personal activity 313 and time duration 315.

Music program server 390 connects to a datastore 380. Datastore 380 stores a plurality of music program records that includes music program record 300. In one embodiment, datastore 380 includes a hard disk, a flash memory. In one embodiment, datastore 380 includes a database. In one embodiment, music program server 390 includes datastore 380.

Music program record 300 includes program entry 301, activity attribute 302 and program duration 303.

Music program server 390 selects music program record 300 wherein activity attribute 302 matches personal activity 313, and program duration 303 matches time duration 315.

In one embodiment, music program server 390 determines that activity attribute 302 matches personal activity 313 if activity attribute 302 relates to personal activity 313. In one example, activity attribute 302 includes "cooking" and personal activity 313 is "cooking a dinner". In one example, activity attribute 302 is a synonym related to personal activity 313. For example, activity attribute 302 is "making a sandwich", "preparing a meal", or "home cooking".

In one embodiment, music program server 390 determines that program duration 303 matches time duration 315 if program duration 303 is smaller than time duration 315. In one example, program duration 303 is 42 minutes and time duration 315 is 50 minutes. In another embodiment, music program server 390 determines that program duration 303 matches time duration 315 if the difference between program duration 303 and time duration 315 is less than a pre-determined value, such as 3 minutes, 5 minutes, or 6 minutes. In one example, program duration 303 is 63 minutes and time duration 315 is 60 minutes. In one embodiment, music program server 390 determines that program duration 303 matches time duration 315 if the difference between program duration 303 and time duration 315 is within 10%, 15%, or 20% of time duration 315.

Figure 3B:
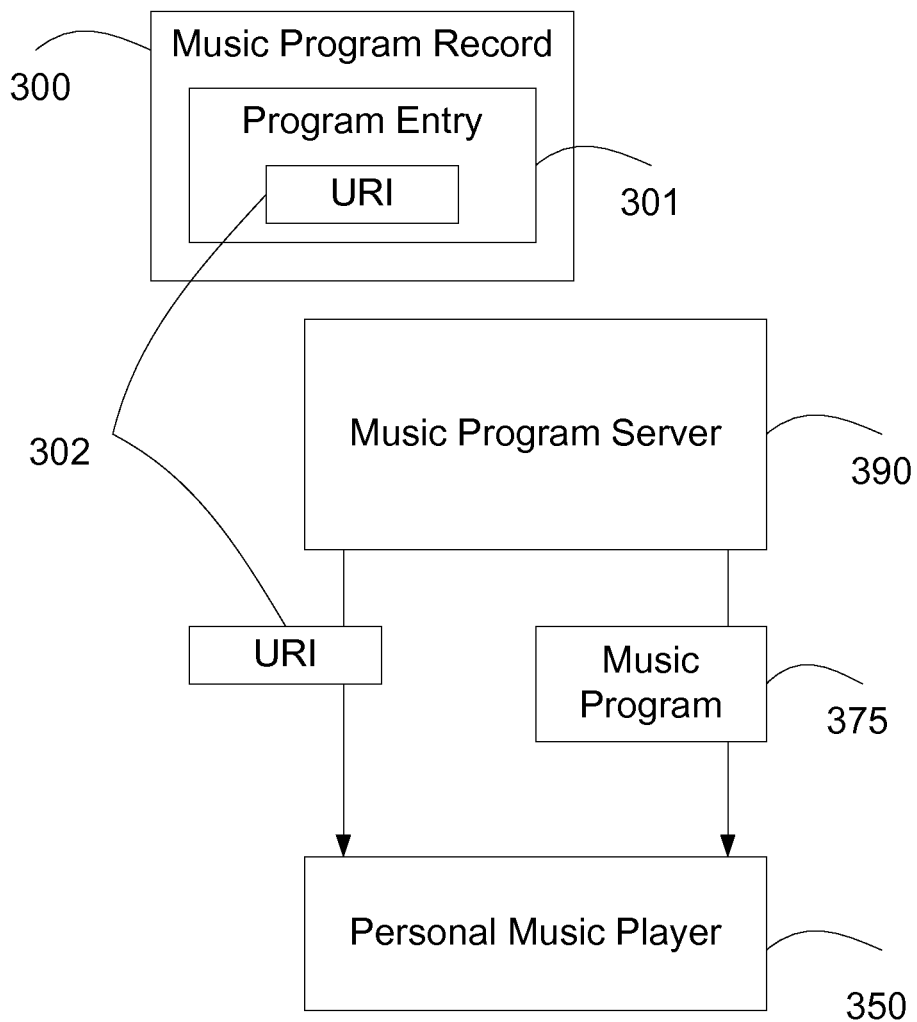
FIG. 3b illustrates a process to deliver a music program.

FIG. 3b illustrates a process to deliver a music program.

Music program server 390 extracts location information for music program 375 from program entry 301. Music program server 390 sends the location information to personal music player 350.

In one embodiment, the location information is URI 302. Music program server 390 sends URI 302 to personal music player 350. Personal music player 350 uses URI 302 to obtain music program 375.

In one embodiment, URI 302 is an RTSP-based URI. Personal music player 350 uses the RTSP-based URI to stream music program 375 from music program server 390. In one embodiment, personal music player 350 streams music program 375 from a different server. Personal music player 350 plays music program 375 while streaming music program 375.

In one embodiment, URI 302 is an FTP-based URI. Personal music player 350 uses the FTP-based URI to obtain music program 375 in the form of an audio file, such as an MP3 file, a WMA file, and AAC file, an Audio Video Interleave (AVI) file, or a Waveform (WAV) file. In one embodiment, personal music player 350 plays music program 375 after obtaining music program 375 in the entirety.

In one embodiment, personal music player 350 includes a storage. The storage stores music program 375. In one embodiment, the storage is a flash drive, a hard disk drive, or a removable memory based on Universal Serial Bus (USB) or Secure Digital Card technology. In one embodiment, program entry 301 includes a title for music program 375. Music program server 390 sends music program 375 title to personal music player 350. Personal music player 350 retrieves music program 375 from the storage based on music program 375 title.

Figure 4A:
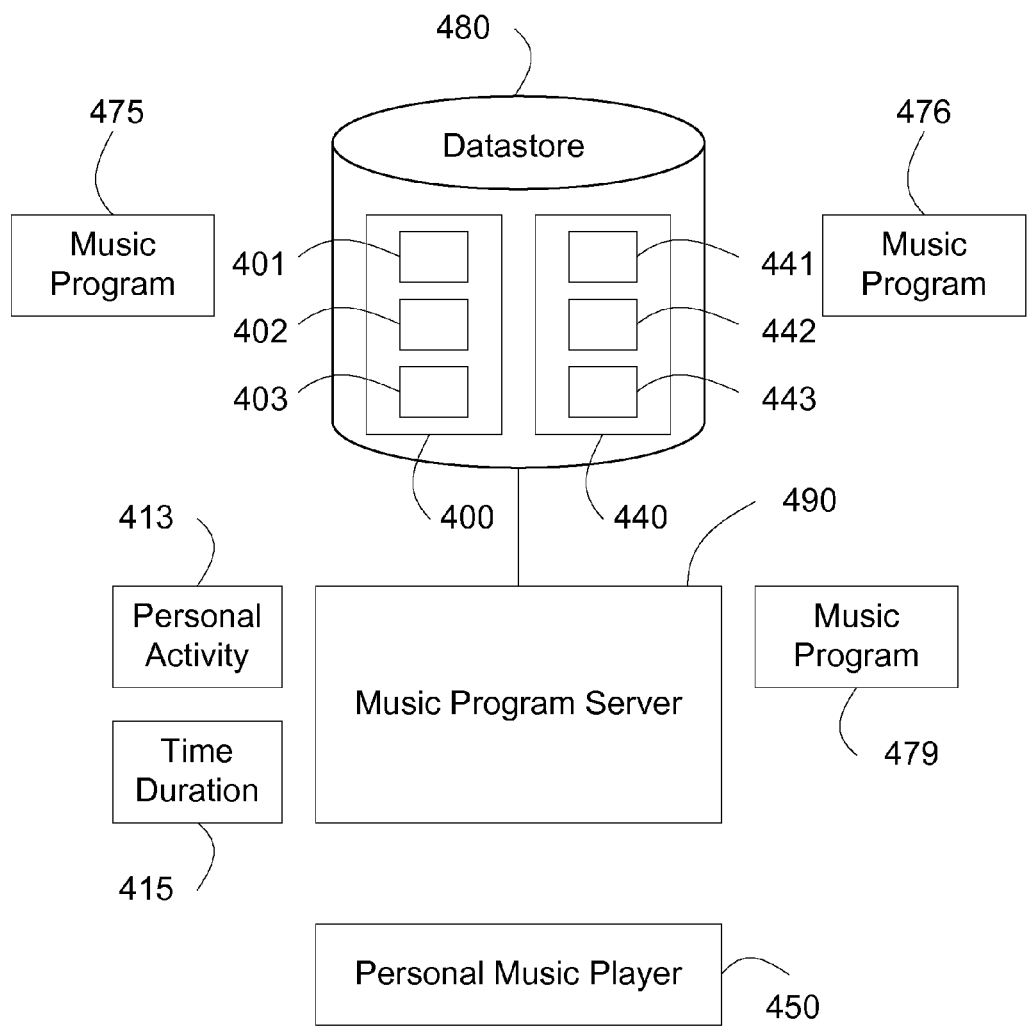
FIGS. 4a-4b illustrate a process to determine and deliver two or more music programs.

FIG. 4a illustrates a process to determine and deliver two or more music programs.

Music program server 490 determines music program 479 based on personal activity 413 and time duration 415. Music program 479 includes a plurality of two or more music programs.

In one embodiment, music program 479 includes music program 475 and music program 476. In one embodiment, music program server 490 connects to datastore 480, and datastore 480 includes music program records 400 and 440. Music program record 400 includes program entry 401, activity attribute 402 and program duration 403. Music program record 440 includes program entry 441, activity attribute 442 and program duration 443. Program entry 401 includes location information for music program 475 and program entry 441 includes location information for music program 476.

Music program server 490 selects music program records 400 and 440 wherein both activity attributes 402 and 442 match personal activity 413, and wherein the sum of program durations 403 and 443 match time duration 415. In one embodiment, the sum of program durations 403 and 443 matches time duration 415 if the sum is shorter than time duration 415. In another embodiment, the sum matches time duration 415 if the difference between the sum and time duration 415 is less than a pre-determined value; or if the difference between the sum and time duration 415 is within 10%, 15%, or 20% of time duration 415.

In one embodiment, music program server 490 extracts first location information for music program 475 from program entry 401 and extracts second location information for music program 476 from program entry 441. Music program 479 includes the first location information and the second location information.

In one embodiment, music program 479 is a Hypertext Markup Language (HTML) file that includes the first location information and the second location information. Music program server 490 generates music program 479, and sends music program 479 to personal music player 450. Personal music player 450 uses the first location information to obtain music program 475 and the second location information to obtain music program 476. In one embodiment, personal music player 450 plays music program 476 after playing music program 475.

In a different embodiment, music program server 490 generates music program 479 by combining music programs 475 and 476. Music program server 490 sends location information for music program 479 as described in FIG. 3*b*.

Figure 4B:
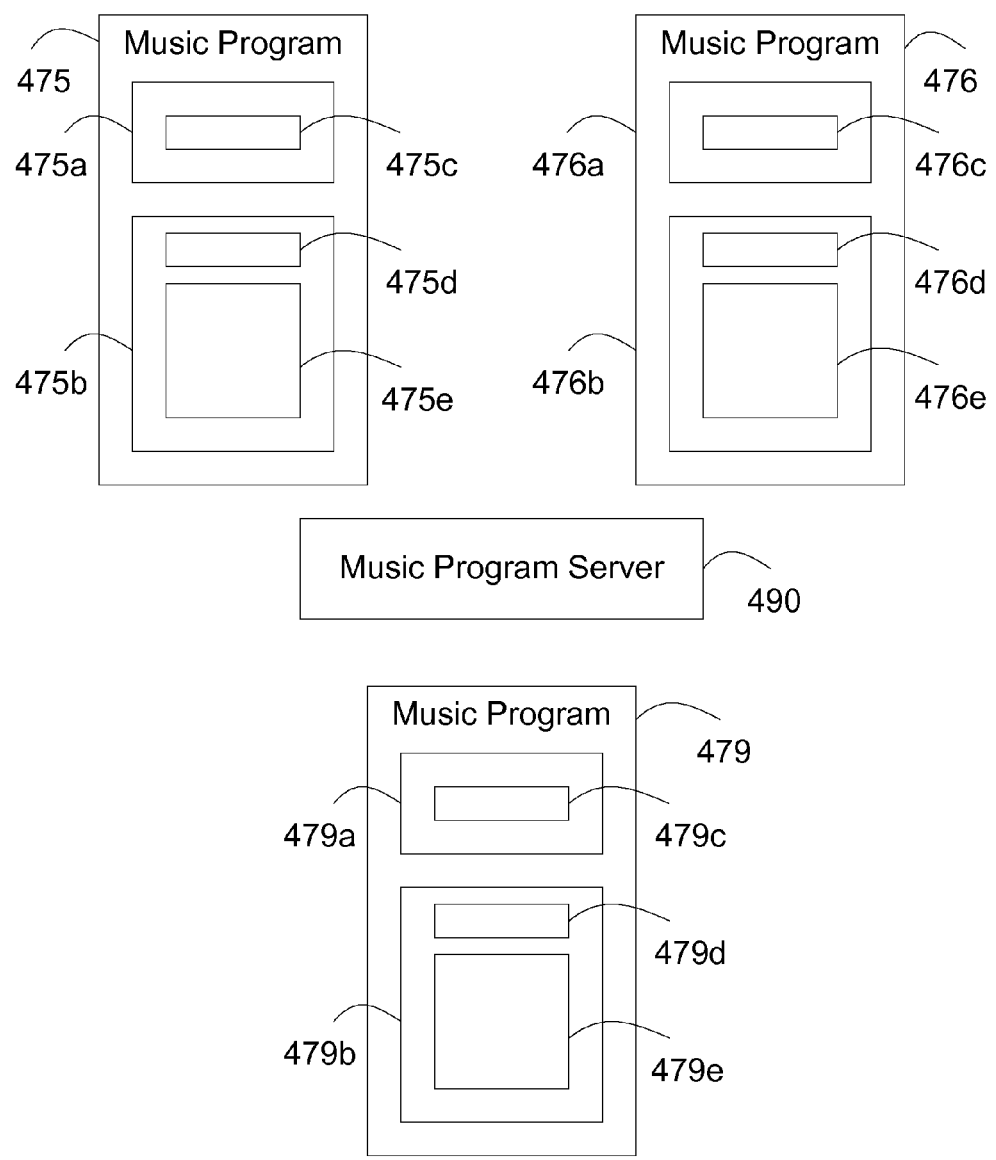

In one embodiment, music programs 475 and 476 are audio files in a common audio digital format, such as Waveform Audio format (WAV) files with audio data encoded in uncompressed 16-bit mono Pulse Code Modulation (PCM) format at a sample rate of 44,100. As illustrated in FIG. 4*b*, music program 475 includes header 475*a* and data chunk 475*b*. Header 475*a* includes chunk size 475*c* and audio data format information. Data chunk 475*b* includes data chunk size 475*d* and audio data 475*e*. Likewise, music program 476 includes header 476*a*, chunk size 476*c*, data chunk 476*b*, data chunk size 476*d* and audio data 476*e*.

Music program server 490 combines data chunk 475*b* and data chunk 476*b* into data chunk 479*b* of music program 479. Music program server 490 stores audio data 475*e* into audio data 479*e* of music program 479, and then appends audio data 476*e* to audio data 479*e*. Music program server 490 computes data chunk size 479*d* of music program 479 as the sum of data chunk size 475*d* and data chunk Size 476*d*.

Header 475*a* and header 476*a* are similar with a possible difference in chunk size 475*c* and chunk size 476*c*. Music program server 490 copies header 475*a* into header 479*a* of music program 479, and computes chunk size 479*c* of music program 479. In one embodiment, music program server 490 computes chunk size 479*c* as the file size of music program 479. In another embodiment, Music program server 490 computes chunk size 479*c* as the file size of music program 479 starting after the location of chunk size 479*c* in the file.

In one embodiment, music program server 490 inserts a plurality of audio data before appending audio data 476*e* in 479*e* of music program 479. In one embodiment, the inserted audio data represents silence for a period of time, such as 3 seconds, 5 seconds, or 22 milli-seconds. In one embodiment, the inserted audio data include a music interlude. Music program server 490 computes data chunk size 479*d* and chunk size 479*c* accordingly.

In one embodiment, the audio digital formats of music programs 475 and 476 are different; music program server 490 converts music programs 475 and 476 to a common audio digital format before generating music program 479.

In one embodiment, a personal activity 113 is described using a phrase such as "taking a walk". In another embodiment, personal activity 113 is described with an event name such as "Rock Concert", "Town Hall Meeting", "Monday Night Football", where user 110 may attend. In one embodiment, personal activity 113 is a common activity user 110 does normally such as "going to the mall", "driving to work", "doing lunch". In one embodiment, personal activity 113 is characterized with a plurality of words describing or suggesting an activity user 110 participates in or may participate in the future. Personal activity 113 differs or is separate from the listening activity of the music program 175, the usage of the media player 150 that leads to the listening activity, and/or the user's interaction with the data that make up the music program(s). Typically, user 110 participates in the personal activity 113 while user 110 enjoys listening to the music program 175. Further examples of personal activity 113 include sports activities or sport events; commuting activities such as driving to work, taking a train, commuting on a bus, or commuting in a car; reading activities such as reading a book, reading the news, reading a magazine, or reading a cooking recipe; shopping activities such as shopping in a mall, shopping in a store, or on-line shopping; watching activities such as watching television, watching a slide show, watching pictures, or watching kids play in a playground; dining activities such as lunch, breakfast, or dinner; home or personal chores such as doing laundry, cooking, painting, house cleaning, or gardening; leisure activities such as fishing, golfing, hiking, sun tanning on a beach, or playing a video game.

In one embodiment, a reading activity includes a subject matter or a title, for example, the reading activity is "reading the New York Times", "reading Harry Potter", or "reading a history book".

In one embodiment, a sports activity or sporting event includes "watching a sporting event" or a type of sport such as "football", "soccer", "fishing", or "basketball".

In one embodiment, the personal music player 150 sends a request to the music program server 190 for a music program. The request includes a commuting activity, a sports activity, or a reading activity. The music program server 190 determines music program 175 based on the commuting activity, the sports activity, or the reading activity in the request, as described above with reference to FIGS. 3*a* and 4*a*. The music program server 190 then sends the music program 175, or the combined music program 479, to the personal music player 150 as described above with reference to FIG. 3*b*.

In one embodiment, personal music player 150 is a portable MP3 music player, a mobile phone that includes a music player, an electronic reading device with music playing capabilities, an Internet radio, an in-car networked audio system, and Internet audio system, or a networked home entertainment system. In one embodiment, personal music player 150 is a networked computing device such as a personal computer, a notebook, a mini-notebook, or a personal digital assistant. In one embodiment, the networked computing device includes a program or software that plays music program 175.

In one embodiment, music program server 190 is a computer server communicating with personal music player 150. A typical computer server includes a computing processor unit, main memory, storage and a network interface. In one embodiment, a computer server is a computing system comprising a plurality of computer servers and a plurality of storage devices operatively coupled to each other over a network. In one embodiment, a computer server is a part of the computing system. In one embodiment, music program server 190 is a computing device such as a home media center, a personal computer, a notebook, an MP3 player, or a home entertainment system.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless. Other variations and embodiments are possible in light of above teachings, and it is thus intended that the scope of invention not be limited by this Detailed Description, but rather by Claims following.

What is claimed is:

1. A method for providing a music service tailored for a personal preference, comprising:
   (a) receiving from a music media player by a music server the personal preference inputted by a user of the music media player;
   (b) matching a first song and a second song to the personal preference, the first song comprising a first audio data and a first data size, the second song comprising a second audio data and a second data size;
   (c) in response to the matching, composing a file comprising a combined music program by the music server, the file comprising a header and a combined data chunk, the combined data chunk comprising a data chunk size of the combined music program and combined audio data, wherein the composing comprises:
      (c1) computing the data chunk size as a size of the combined music program from the first data size and the second data size, the data chunk size not including the header; and
      (c2) composing the combined audio data of the combined music program by appending the second audio data to the first audio data; and
      (c3) compute and store a chunk size in the header of the file, the computed chunk size being a file size of the music program starting after a location of the computed chunk size in the file
   (d) sending the file comprising the header and the combined data chunk to the music media player.

2. The method of claim 1, further comprising:
   (e) receiving the file comprising the header and the combined data chunk by the music media player; and
   (f) playing the combined audio data in the combined data chunk by the music media player.

3. The method of claim 2, wherein the playing (f) comprises:
   (f1) storing the file comprising the header and the combined data chunk by the music media player in a data storage; and
   (f2) playing the combined audio data stored in the combined data chunk by the music media player.

4. The method of claim 1, wherein the computing (c1) comprises:
   (c1i) computing the data chunk size of the combined music program according to a time duration of the combined music program.

5. The method of claim 1, wherein the personal preference comprises a time duration.

6. The method of claim 5, wherein the computing (c1) comprises:
   (c1i) computing the data chunk size according to a time duration of the combined music program, wherein the time duration of the combined music program matches the time duration comprised in the personal preference.

7. The method of claim 1, wherein the composing (c2) further comprises:
   (c2i) inserting additional audio data into the combined music program, wherein the additional audio data is different from the first audio data and the second audio data.

8. The method of claim 7, wherein the additional audio data is played by the media player between a playing of the first song and a playing of the second song.

9. A non-transitory computer readable medium with program instructions method for providing a music service tailored for a personal preference, wherein when the program instructions are executed by at least one computer, causes the at least one computer to:
   (a) receive from a music media player the personal preference inputted by a user of the music media player;
   (b) match a first song and a second song to the personal preference, the first song comprising a first audio data and a first data size, the second song comprising a second audio data and a second data size;
   (c) in response to the matching, compose a file comprising a combined music program, the file comprising a header and a combined data chunk, the combined data chunk comprising a data chunk size of the combined music program and combined audio data, wherein the compose comprises:
      (c1) compute the data chunk size as a size of the combined music program from the first data size and the second data size, the data chunk size not including the header; and
      (c2) compose the combined audio data of the combined music program by appending the second audio data to the first audio data; and
      (c3) compute and store a chunk size in the header of the file, the computed chunk size being a file size of the music program starting after a location of the computed chunk size in the file
   (d) send the file comprising the header and the combined data chunk to the music media player.

10. The medium of claim 9, further comprising:
    (e) receive the file comprising the header and the combined data chunk by the music media player; and
    (f) in response to receiving the combined music program, play the combined audio data in the combined data chunk by the music media player.

11. The medium of claim 10, wherein the play (f) comprises:
    (f1) store the file comprising the header and the combined data chunk by the music media player in a storage; and
    (f2) play the combined audio data stored in the combined data chunk by the music media player.

12. The medium of claim 9, wherein the compute (c1) comprises:
    (c1i) compute the data chunk size of the combined music program according to a time duration of the combined music program.

13. The medium of claim 9, wherein the personal preference comprises a time duration.

14. The medium of claim 13, wherein the compute (c1) comprises:
    (c1i) compute the data chunk size according to a time duration of the combined music program, wherein the time duration of the combined music program matches the time duration comprised in the personal preference.

15. The medium of claim 12, wherein the compose (c2) further comprises:
    (c2i) insert additional audio data into the combined music program, wherein the additional audio data is different from the first audio data and the second audio data.

16. The medium of claim 15, wherein the additional audio data is played by the media player between a playing of the first song and a playing of the second song.

17. A system, comprising:

a music server, wherein the music server:

(a) receives from a music media player a personal preference inputted by a user of the music media player;

(b) matches a first song and a second song to the personal preference, the first song comprising a first audio data and a first data size, the second song comprising a second audio data and a second data size;

(c) in response to the matching, composes a file comprising a combined music program, the file comprising a header and a combined data chunk, the combined data chunk comprising a data chunk size of the combined music program and combined audio data, wherein the composes comprises:

(c1) computes the data chunk size as a size of the combined music program from the first data size and the second data size, the data chunk size not including the header; and (c2) composes the combined audio data of the combined music program by appending the second audio data to the first audio data; and (c3) compute and store a chunk size in the header of the file, the computed chunk size being a file size of the music program starting after a location of the computed chunk size in the file (d) sends the file comprising the header and the combined data chunk to the music media player.

18. The system of claim 17, further comprising:

the music media player, wherein the music media player further receives the file comprising the header and the combined data chunk and plays the combined audio data in the combined data chunk.

19. The system of claim 18, wherein the music media player stores the file comprising the header and the combined data chunk in a storage of the music media player and plays the combined audio data stored in the combined data chunk.

20. The system of claim 17, wherein the computes (c1) comprises:

(c1i) computes the data chunk size of the combined music program according to a time duration of the combined music program.

21. The system of claim 17, wherein the personal preference comprises a time duration.

22. The system of claim 21, wherein the computes (c1) comprises:

(c1i) computes the data chunk size according to a time duration of the combined music program, wherein the time duration of the combined music program matches the time duration comprised in the personal preference.

23. The system of claim 21, wherein the composes (c2) further comprises:

(c2i) insert additional audio data into the combined music program, wherein the additional audio data is different from the first audio data and the second audio data.

24. The system of claim 23, wherein the additional audio data is played by the media player between a playing of the first song and a playing of the second song.

* * * * *